US006977731B1

(12) United States Patent
Lee et al.

(10) Patent No.: US 6,977,731 B1
(45) Date of Patent: Dec. 20, 2005

(54) METHOD AND APPARATUS FOR ENHANCING THE RESOLVING POWER OF A TUNABLE OPTICAL FILTER

(75) Inventors: Chang-Hee Lee, Taejon (TW); Kwang Uk Chu, Taejon (TW)

(73) Assignee: Novera Optics, Inc., Palo Alto, CA (US)

( * ) Notice: Subject to any disclaimer, the term of this patent is extended or adjusted under 35 U.S.C. 154(b) by 570 days.

(21) Appl. No.: 10/081,657

(22) Filed: Feb. 21, 2002

Related U.S. Application Data

(60) Provisional application No. 60/270,577, filed on Feb. 21, 2001.

(51) Int. Cl.$^7$ ............................................. G01B 9/02
(52) U.S. Cl. .................................................... 356/519
(58) Field of Search ................................ 356/519, 480; 372/32

(56) References Cited

U.S. PATENT DOCUMENTS

| | | | |
|---|---|---|---|
| 5,166,618 A | 11/1992 | Chase et al. | |
| 5,287,214 A | 2/1994 | Robertson et al. | |
| 5,305,402 A | 4/1994 | Hill et al. | |
| 5,652,809 A | 7/1997 | Aronson | |
| 5,781,268 A | 7/1998 | Liu et al. | |
| 5,796,479 A | 8/1998 | Derickson et al. | |
| 6,021,237 A | 2/2000 | Kim et al. | |
| 6,253,002 B1 | 6/2001 | Kim et al. | |
| 6,266,462 B1 | 7/2001 | Kim et al. | |
| 6,396,574 B1 | 5/2002 | Lee et al. | |
| 6,580,516 B1 * | 6/2003 | Tucker et al. | 356/519 |
| 6,670,045 B1 | 12/2003 | Gillich et al. | |
| 2001/0004290 A1 | 6/2001 | Lee et al. | |

FOREIGN PATENT DOCUMENTS

KE     1020020061412 A     7/2002

OTHER PUBLICATIONS

Kwang-Uk Chu, Kun-Youl Park, Chang-Hee Lee, Sang-Yung Shin, Y.J. Oh, "A simple and low cost channel analyzer for a dense wavelength-division multiplexing systems," 5th Optoelectronics and Communications Conference (OECC2000), Chiba, Japan, Serial 14A4-3, pp. 474-475, (Jul. 2000).

Paul Horowitz and Winfield Hill, "The Art of Electronics: Second Edition," Cambridge University Press, pp. vii-xvii and 1031-1034 (1990).

Howard V. Malmstadt, et al., "Electronic Measurements for Scientist," W.A. Benjamin, Inc., pp. v-xii and 824-831 (1974).

Stamatios V. Kartalopoulos, "Introduction to DWDM Technology," SPIE Optical Engineering Press, pp. vii-xiv, 4-7, 75-76, and 87-88 (2000).

\* cited by examiner

*Primary Examiner*—Samuel A. Turner
*Assistant Examiner*—Patrick Connolly
(74) *Attorney, Agent, or Firm*—Blakely, Sokoloff, Taylor & Zafman LLP

(57) ABSTRACT

A method and an apparatus for enhancing a resolving power of a tunable optical filter. An optical input is applied to the tunable filter. An electrical signal is applied to the tunable optical filter. The electrical signal has a first component that has a first frequency and a second component that has a second frequency. The second frequency is higher than the first frequency. An optical output of the tunable optical filter is applied to a photodetector. The electrical output from the photodetector is applied to a lock-in detector. The lock-in detector receives an input from frequency doubling circuitry. An output of the lock-in detector is monitored.

16 Claims, 11 Drawing Sheets

METHOD AND APPARATUS FOR ENHANCING THE RESOLVING POWER OF A TUNABLE OPTICAL FILTER

CROSS-REFERENCE TO RELATED APPLICATION

The present application is related to and claims priority from U.S. provisional patent application No. 60/270,577, filed Feb. 21, 2001, entitled Novel Method of Enhancing the Resolving Power of Tunable Optical Filters for Accurate Channel Power Measurement in Dense WDM Systems.

FIELD OF THE INVENTION

The present invention pertains to the field of dense wavelength division multiplexing ("DWDM") optical networking. More particularly, the invention relates to a technique for applying a synthesized electrical signal to a tunable optical filter and detecting the results in order to enhance the resolving power of the tunable optical filter in channel power measurement in a DWDM optical system.

BACKGROUND OF THE INVENTION

Fiberoptic networks are increasingly being deployed to provide high bandwidth transmission of voice, data, video, and internet services. Optical signals are sent through the fiber and switched either optically or electrically at switching nodes.

Wavelength division multiplexing ("WDM") is an optical technique that enables multiple channels of different wavelengths to be carried in the same fiber, thus increasing the bandwidth per fiber to the sum of the bit rates of each wavelength. The WDM technique uses different wavelengths of light transported down the same fiber to carry different channels of information. DWDM systems multiplex a large number of wavelengths—such as more than 40 wavelengths—in each fiber, thus further increasing single fiber bandwidth. The direction of technology is to increase the number of wavelengths carried by DWDM systems, which decreases the channel spacing between wavelengths or channels. For example, certain prior art DWDM systems have a channel spacing of 0.2 nanometers ("nm").

A Fabry-Perot optical filter comprises two high reflectance mirrors, such as dielectric multilayers, separated by a space layer. There is multiple interference in the space layer of the filter, which causes the output spectral characteristic of the filter to peak sharply over a narrow band of wavelengths.

FIG. 1 shows a typical transmittance spectrum of a tunable Fabry-Perot optical filter at a single voltage. The transmittance spectrum shown in FIG. 1 is relatively narrow, which shows why Fabry-Perot optical filters are useful as band-pass filters. For the example of FIG. 1, the Fabry-Perot filter has a 3-dB bandwidth of 0.1 nm.

The Fabry-Perot optical filter is tunable given the presence of a piezoelectric transducer in the space layer of the filter. The piezoelectric transducer of the tunable filter expands when an increasing voltage is applied to the transducer. The expanding piezoelectric transducer in turn expands the thickness of the space layer. Changing the thickness of the space layer in turn changes the transmittance spectrum of the filter. In particular, the peak of the transmittance spectrum moves towards higher wavelengths as the voltage applied to the piezoelectric transducer increases. FIG. 2 shows two transmittance spectra for the same tunable Fabry-Perot optical filter, but with two different direct current ("DC") voltages applied to the piezoelectric transducer of the Fabry-Perot filter.

An example of one prior use for a tunable Fabry-Perot optical filter is in a prior art optical channel analyzer for a DWDM system. The optical channel analyzer measures wavelength, optical power, and optical signal-to-noise ratio of an optical channel in order to monitor the performance of the optical channels in the DWDM system.

One disadvantage of a typical prior art tunable Fabry-Perot optical filter is that it does not have an ideal transmittance spectrum. The typical tunable Fabry-Perot optical filter has a transmittance spectrum like the one shown in FIG. 1, with a wide skirt towards the bottom of the transmittance spectrum, which limits the resolving power of the typical Fabry-Perot optical filter.

To help to overcome this problem, a very narrow tunable Fabry-Perot optical filter could be used to extract wavelength channels from the DWDM signals. Such an approach is disadvantageous, however, because expensive high-technology is needed to create such narrow bandwidth Fabry-Perot filters. Moreover, with such narrow bandwidth Fabry-Perot filters, measurement sensitivity is reduced because the light intensity typically weakens upon passing through a narrow bandwidth Fabry-Perot filter.

SUMMARY OF THE INVENTION

A method is described for enhancing a resolving power of a tunable optical fiber. An optical input is applied to the tunable optical filter. An electrical signal is applied to the tunable optical filter. The electrical signal has a first component having a first frequency and a second component having a second frequency. The second frequency is higher than the first frequency. The output of the tunable optical filter is detected.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus are described for effectively reducing the bandwidth of a tunable optical filter and to improve measurement sensitivity. The embodiments described help to enhance the resolving power of a tunable optical filter. This allows the use of a tunable Fabry-Perot optical filter with a relatively wide bandwidth in conjunction with certain dense wavelength division multiplexing ("DWDM") systems and helps to avoid the need for an expensive narrow bandwidth tunable Fabry-Perot optical filter. Embodiments of the invention use filter dithering and lock-in detection.

Figure 1:
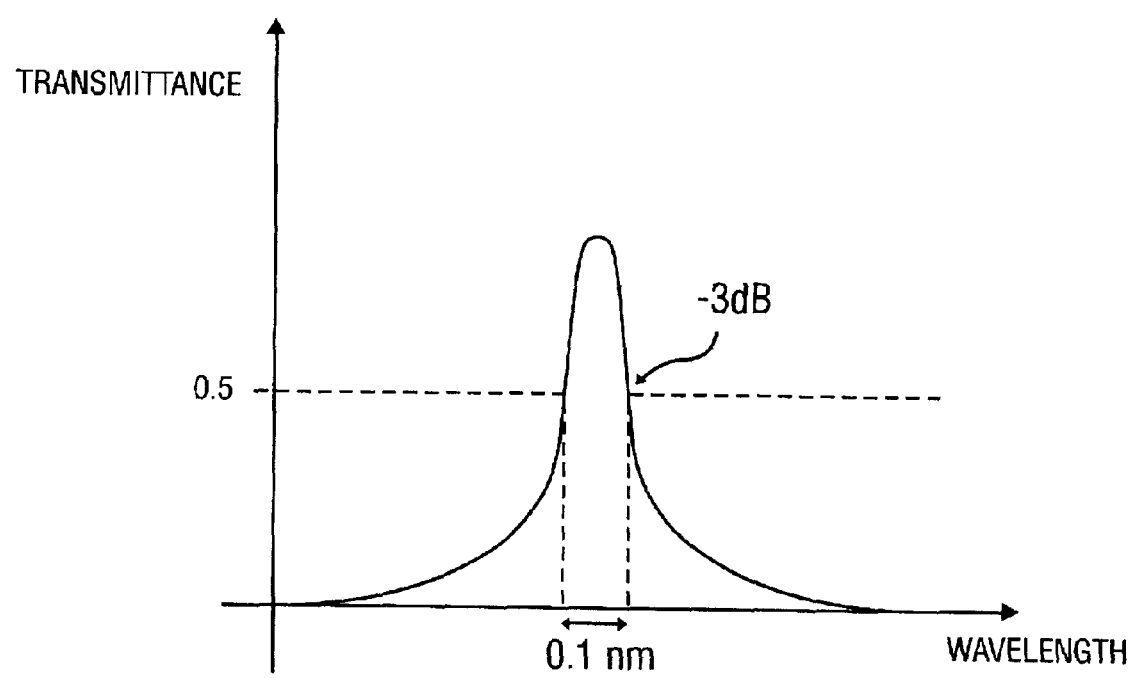
FIG. 1 illustrates an example of a prior art transmittance spectrum at a single voltage of a prior art tunable Fabry-Perot optical filter.
Figure 2:
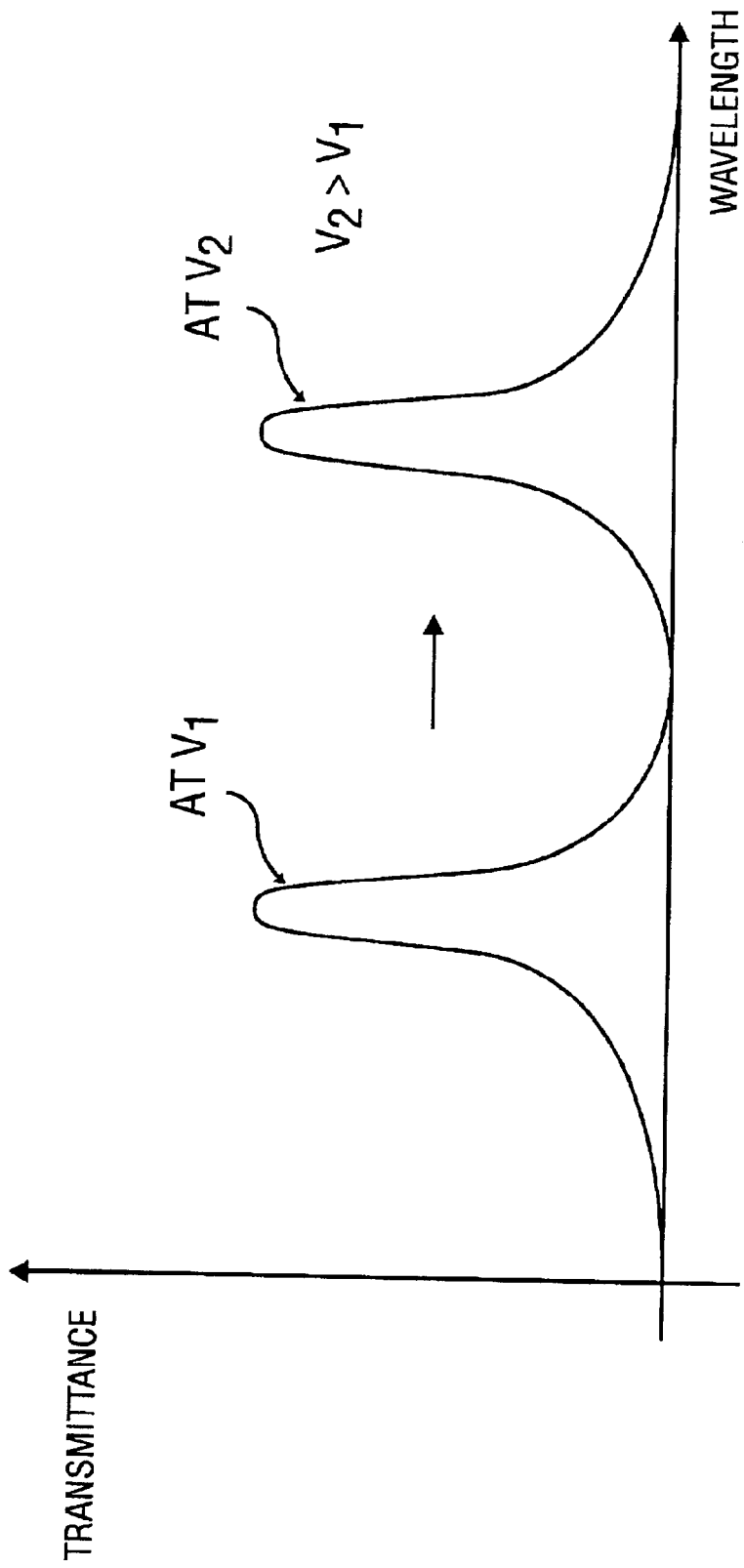
FIG. 2 shows an example of two prior art transmittance spectra at two respective direct current voltages for a prior art tunable Fabry-Perot optical filter.
Figure 3:
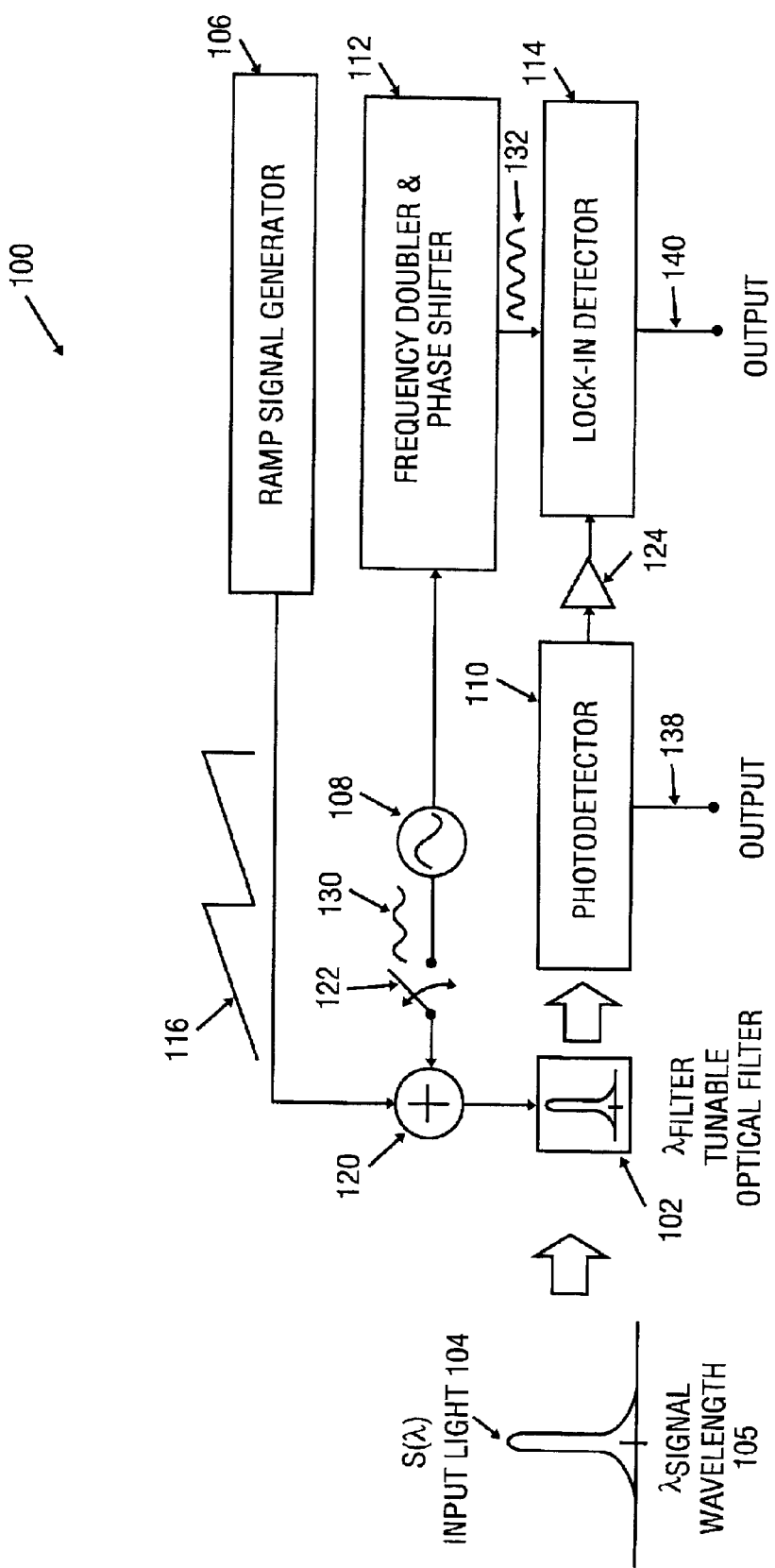
FIG. 3 is a block diagram of an apparatus for enhancing the resolving power of a tunable Fabry-Perot optical filter.

FIG. 3 is a schematic diagram of apparatus 100 for enhancing the resolving power of the tunable Fabry-Perot optical filter 102. Apparatus 100 includes a tunable optical filter 102, a low frequency ramp generator 106, a high frequency signal generator 108, photodetector 110, a frequency doubler and phase shifter 112, and a lock-in detector 114. Apparatus 100 includes a switch 122 for determining the application of the high frequency sinusoidal signal 130 to the tunable optical filter 102. Apparatus 100 includes summation circuitry 120 for summing the low frequency ramp signal 116 and the high frequency sinusoidal signal 130. Apparatus 100 also includes an amplifier 124 coupled between the photodetector 110 and the lock-in detector 114.

Input light 104 is applied to an optical input of the tunable Fabry-Perot optical filter 102. For one embodiment of the invention, input light 104 has a very narrow spectrum, of which the center wavelength is represented by $\lambda_{signal}$ 105. The optical output of the tunable optical filter 102 is detected by photodetector 110.

Figure 4:
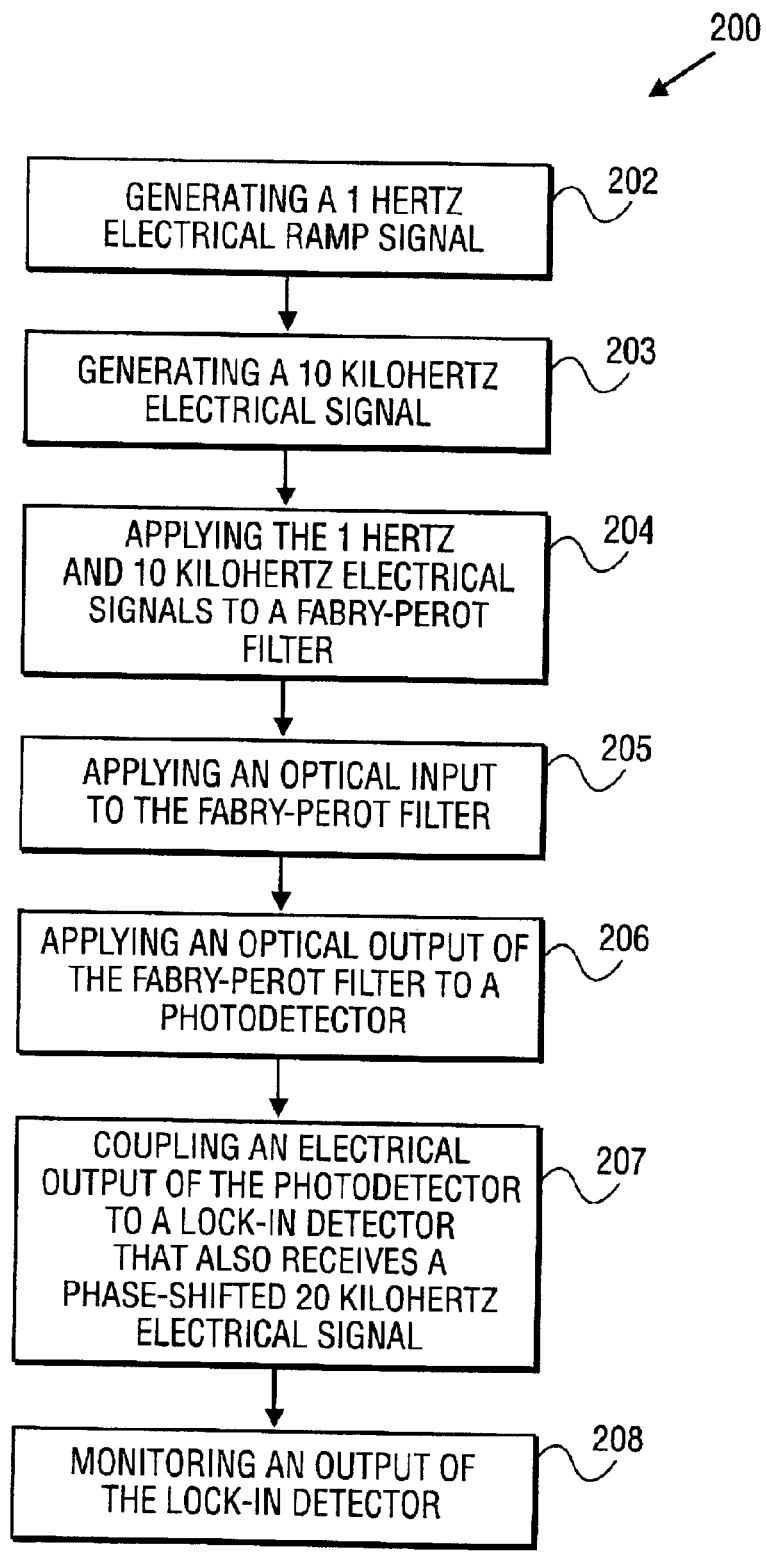
FIG. 4 is a flow chart of a method for enhancing the resolving power of a tunable Fabry-Perot optical filter.

FIG. 4 sets forth the operations 200 associated with the method used by apparatus 100 in order to enhance the resolving power of tunable Fabry-Perot optical filter 102. Ramp signal generator 106 generates a 1-Hz ramp signal 116, which is operation 202. Ramp signal 116 is also referred to as sawtooth signal 116. At operation 203, signal generator 108 generates a small high frequency sinusoidal electrical signal 130. For one embodiment, signal 130 is a 10-kHz sinusoidal signal with amplitude that is substantially less than the amplitude of the 1-Hz ramp signal 116.

At operation 204, the 1-Hz electrical signal 116 and the 10-kHz electrical signal 130 are applied to Fabry-Perot tunable optical filter 102. This is done by closing switch 122 and using summation circuitry 120 to sum signals 116 and 130. The combined electrical signals 116 and 130 are applied as voltages to a piezoelectric transducer of tunable Fabry-Perot optical filter 102. The piezoelectric transducer of optical filter 102 allows filter 102 to be tunable.

At operation 205, input light 104 having one or more wavelengths is applied to the optical input of tunable optical filter 102 at the same time that the summation of electrical signals 116 and 130 is being applied to the piezoelectric transducer of tunable optical filter 102.

The resulting optical output of tunable output Fabry-Perot filter 102 is applied to the optical input of photodetector circuitry 110, which is shown by operation 206. The photodetector 110 converts the optical signal to an electrical signal. The electrical signal produced by the photodetector can be monitored at output 138 of photodetector 110.

At operation 207, the electrical output of photodetector 110 is also coupled to an input of lock-in detector circuitry 114. For one embodiment, the output of photodector 110 passes through amplifier 124 before being sent to the input of lock-in detector 114.

As shown by operation 207, lock-in detector 114 also receives a phase-shifted 20-kHz electrical signal 132 from frequency doubler and phase shifter circuitry 112. Frequency doubler and phase shifter circuitry 117 receives as an input the 10-kHz small sinusoidal signal 130 from signal generator 108. Circuitry 112 then doubles the frequency of the sinusoidal signal 130 and phase shifts the signal 130 to produce signal 132 that is sent as an input to lock-in detector circuit 114. The 20-kHz signal 132 acts as a reference signal for lock-in detector 114.

At operation 208, the output 140 of lock-in detector 114 is monitored to determine the electrical signal that is representative of the input light to the tunable Fabry-Perot optical filter 102.

The method 200 of FIG. 4 effectively reduces the 3-dB bandwidth of the tunable optical filter 102 and improves channel power measurement accuracy.

Figure 5:
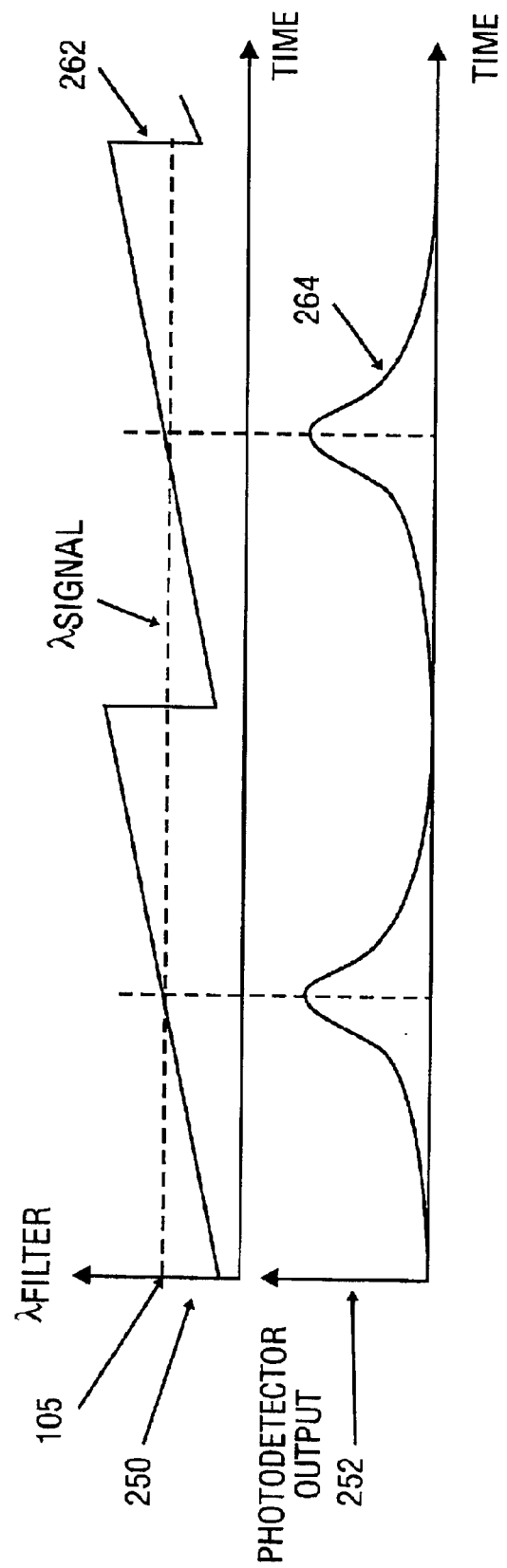
FIG. 5 shows a 1-Hz electrical ramp signal applied to the tunable Fabry-Perot optical filter and the resulting photodetector output.

FIG. 5 shows the properties of apparatus 100 when switch 122 is open. Graph 250 of FIG. 5 plots the peak transmittance wavelength $\lambda_{filter}$ of the tunable optical filter 102 versus time. The plot 250 results in waveform 262, which is similar to the 1-Hz sawtooth signal 116. The sawtooth signal 116 steps the tunable optical filter 102 through the various wavelengths. For one embodiment, waveform 262 varies between peak transmittance wavelengths of 1510 nm and 1600 nm. The peak transmittance wavelength of the tunable optical filter 102 thus increases linearly in accordance with the 1-Hz sawtooth signal 116.

FIG. 5 also shows plot 252 of the output 138 of photodetector 110 versus time when switch 122 is open. The resulting waveform 264 shows that the electrical output 138 of photodetector 110 peaks when the peak transmittance wavelength $\lambda_{filter}$ of tunable Fabry-Perot optical filter 102 matches the wavelength $\lambda_{signal}$ 105 of the input light 104.

Figure 6:
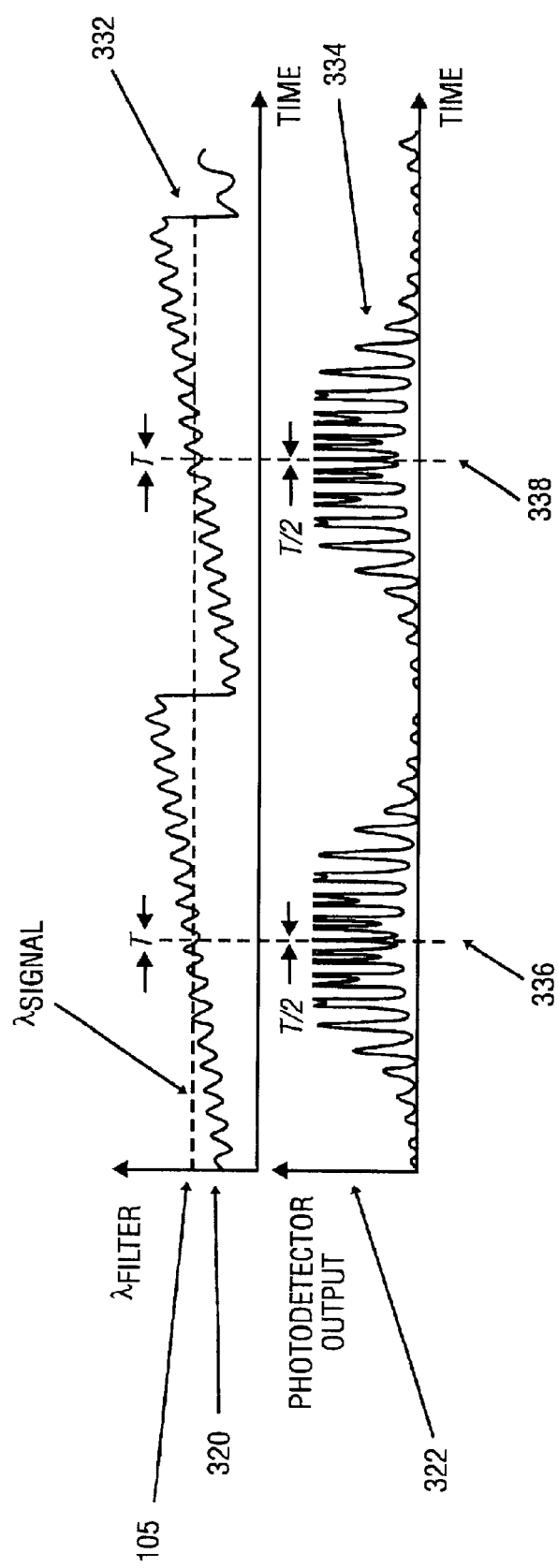
FIG. 6 shows combined 1-Hz and 10-kHz electrical signals applied to the tunable Fabry-Perot optical filter and the resulting photodetector output.

FIG. 6 shows the properties of circuitry 100 when switch 122 is closed, which means that sinusoidal signal 130 is summed in summation circuitry 120 with the sawtooth signal 116. Graph 320 of FIG. 6 plots the peak transmittance wavelength $\lambda_{filter}$ of the tunable optical filter 102 versus time. Waveform 332 is produced because the sinusoidal signal 130 is added to the ramp signal 116 for signal dithering. Waveform 332 indicates that the peak transmittance wavelength of the tunable optical filter 102 increases slowly in accordance with the ramp signal 116, but also oscillates at high speed due to the small high frequency sinusoidal signal 130. The frequency of signal 130 equals 1/T, which equals $\omega_0/2\pi$. For one embodiment, the frequency of signal 130 is 10 kHz. The period of the dithering with respect to waveform 332 is T.

FIG. 6 also shows plot 322 of the output 138 of photodetector 110 versus time when switch 122 is closed, which results in waveform 334. Points 336 and 338 are the times when the peak transmittance wavelength $\lambda_{filter}$ of tunable optical Fabry-Perot matches the wavelength $\lambda_{signal}$ of the input optical signal 104.

When the peak transmittance wavelength $\lambda_{filter}$ of tunable optical filter 102 oscillates around the peak wavelength $\lambda_{signal}$ 105 of the input light 104, the photodetector electrical output 138 shown by waveform 334 has successive peaks with a period of T/2. As the peak transmittance wavelength $\lambda_{filter}$ of tunable optical filter 102 oscillates away from the peak wavelength $\lambda_{signal}$ 105 of the input light 104, the interval between successive peaks gradually changes from T/2 to T.

Figure 7:
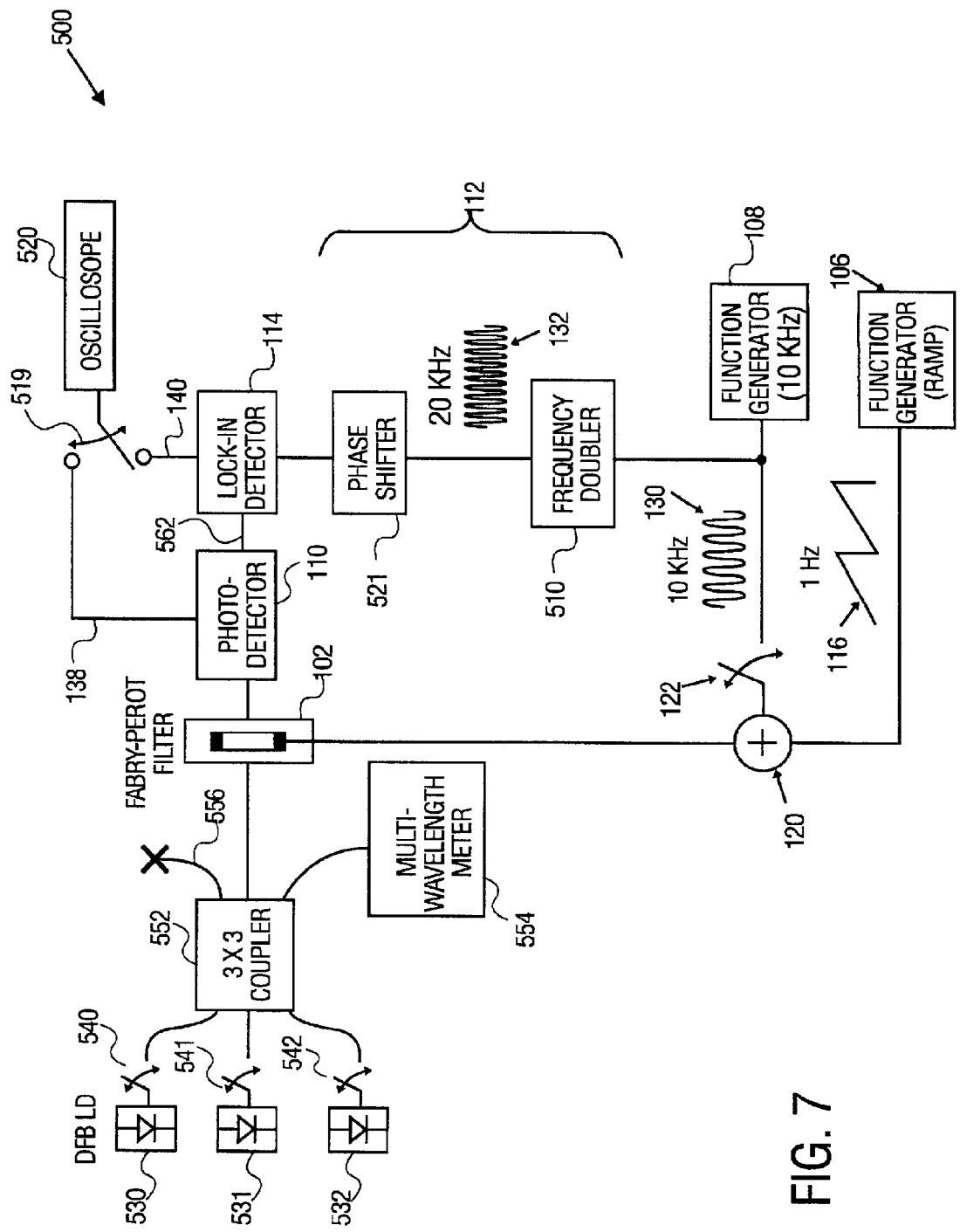
FIG. 7 shows a block diagram of an apparatus used to show the experimental results of enhancing the resolving power of a tunable Fabry-Perot optical filter.

FIG. 7 is a block diagram of apparatus 500 used to show the experimental results of enhancing the resolving power of tunable Fabry-Perot optical filter 102. Apparatus 500 uses distributed-feedback laser diodes ("DFB LDs") 530–532 to provide optical inputs. Oscilloscope 520 monitors the outputs of photodetector 110 and lock-in detector 114.

Three separate light sources are used to apply light to apparatus 500 in order to demonstrate the operation of apparatus 500. For alternative embodiments, various other light sources can be applied to apparatus 500.

Three DFB LD light sources 530, 531, and 532 are coupled to a 3 by 3 coupler 552 via respective switches 540, 541, and 542.

For one embodiment, the DFB LDs 530–532 have wavelengths around 1554.8 nm. DFB LDs 530–532 output light at slightly different wavelengths from each other, with channel spacings that are chosen for the particular application.

The optical outputs of DFB LDs 530–532 are wavelength division multiplexed by the 3 by 3 coupler 552. For one embodiment, the optical powers of DFB LDs 530 and 532 are approximately equal and the optical power of DFB LD 531 is lower than the optical powers of DFB LDs 530 and 532.

Multi-wavelength meter 554 is used to monitor the wavelengths of DFB LDs 530–532. Line 556 is unused.

As the channel spacing between the DFB LDs 530 through 532 decreases, it becomes difficult to resolve individual channels of light from the DFB LDs 530 through 532. Apparatus 500 helps to enhance resolving power of the Fabry-Perot filter 102 in determining the individual optical channels.

Apparatus 500 includes function generator 106 for generating a 1-Hz electrical ramp signal 116 that is applied to summation circuitry 120. Function generator 108 generates a 10-kHz sinusoidal signal 130 that is applied to summation circuitry 120 via switch 122, which is either closed or open. With switch 122 closed, both signals 116 and 130 are summed in summation circuitry 120. The output of summation circuitry 120 is applied to a piezoelectric transducer of Fabry-Perot tunable optical filter 102.

For one embodiment, the tunable Fabry-Perot optical filter 102 has a 3-dB bandwidth of 0.048 nm. For other embodiments of the invention, other tunable Fabry-Perot optical filters can be used that have other bandwidths.

Photodetector 110 receives the optical output of Fabry-Perot filter 102 and provides an electrical output 138 that can be monitored by oscilloscope 520 via switch 519. Another output 562 from photodetector 110 is coupled to lock-in detector 114. For one embodiment, photodetector 110 is directly coupled to lock-in detector 114. For an alternative embodiment, an amplifier 124 is coupled between photodetector 110 and lock-in detector 114 in order to amplify the signal from photodetector 110. For other embodiments, an amplifier is built into either photodetector 110 or lock-in detector 114. Lock-in detector 114 has an output 140 that can be coupled to oscilloscope 520 via switch 519. Oscilloscope 520 thus can monitor the output 138 of photodetector 110 or the output 140 of lock-in detector 114.

Lock-in detection circuitry 114 is able to detect a particular signal even in the presence of electrical noise and drift. Lock-in detection circuitry 114 allows the elimination of portions of a signal that are irrelevant and unwanted.

For one embodiment, conventional lock-in detector circuitry can be used to construct lock-in detector 114. For one embodiment, lock-in detector circuitry 114 includes a variable frequency modulating source and tracking filter, a switchable time-constant post-detection filter, a low noise wide dynamic range amplifier, and a linear phase detector.

Lock-in detector 114 receives a 20-KHz sinusoidal phase-shifted signal 132 as a reference signal. The reference signal is supplied by frequency doubler circuit 510 and phase shifter 521, which comprise the frequency doubler and phase shifter 112 of FIG. 3. For one embodiment, circuits 510 and 521 are combined into one circuit 112. For other embodiments, circuits 510 and 521 are separate circuits. Frequency doubler 510 doubles the frequency of sinusoidal signal 130. Phase shifter 521 allows lock-in detector 114 to maximize the output signal on line 140.

Lock-in detector 114 acts as a multiplier plus an electrical filter. After lock-in detector multiplies (1) the electrical signal received on line 562 from photodector 110 and (2) the reference signal 132 received from phase shifter 521 and frequency doubler 510, the lock-in detector filters out the unwanted signal components and passes on only the amplitude envelope of a signal component synchronized with the reference signal.

The operating principles of apparatus 500 can be understood mathematically as follows. The peak transmittance wavelength of the tunable Fabry-Perot filter 102 is designated by $\lambda_{filter}$ and described as follows:

$$\lambda_{filter} = \left(\frac{\lambda_{pp}}{R_{pp}}\right) \times t + \lambda_0$$

wherein $\lambda_{pp}$ is the full scan range of the tunable Fabry-Perot filter 102, $R_{pp}$ is the peak-to-peak amplitude of the 1-Hz ramp signal 106, and $\lambda_0$ is the wavelength at time t=0. Because $\lambda_{filter}$ is a linear function of time, the optical spectrum can be deduced from the output 138 of the photodetector 110.

The transmittance spectrum of the tunable optical filter 102 is designated as $A(\lambda)$. If switch 122 is open, then only the slowly increasing 1-Hz ramp signal 116 is applied to the tunable optical filter 102. Then, the peak transmittance wavelength of the tunable optical filter 102 increases linearly, as shown by waveform 262 in FIG. 5. If the transmittance spectrum $A(\lambda)$ of the tunable optical filter 102 is symmetric about $\lambda_{filter}$, then the output $D\{t(\lambda)\}$ of the photodetector 110 can be expressed as the convolution of $A(\lambda)$ with the optical spectrum of the input light as follows:

$$D\{t(\lambda)\} = rA(\lambda) \otimes S(\lambda)$$

wherein r is the responsivity of photodetector 110, $S(\lambda)$ is the optical spectrum of input light 104, and $\otimes$ stands for the convolution operator.

Once switch 122 is closed, then the small high frequency sinusoidal signal 130 is added to the ramp signal 116 for filter dithering. The frequency of signal 130 can be expressed by the following equation:

$$f = 1/T = \omega_0/2\pi.$$

When switch 122 is closed, both waveform 116 and waveform 130 are summed by summation circuitry 120. As a result, the waveform 332 shown in FIG. 6 is applied to the tunable optical filter 102. When switch 122 is closed, the transmittance spectrum of the tunable optical filter 102 is represented by the following equation:

$$A(\lambda + \alpha \sin k\lambda)$$

$$k = \omega_0 \left(\frac{R_{pp}}{\lambda_{pp}}\right)$$

wherein α and k are the oscillation amplitude and the frequency of waveform 130 in wavelength domain, respectively.

The output 138 of photodetector 110 is designated by D{t(λ)}. Because α is very small, the output 138 of photodetector 110 can be enumerated by the Taylor series expansion as follows:

$$D\{t(\lambda)\} = rA(\lambda + \alpha\sin k\lambda) \otimes S(\lambda)$$

$$= r\left[A(\lambda) + (\alpha\sin k\lambda)A'(\lambda) + \frac{1}{2}(\alpha\sin k\lambda)^2 A''(\lambda) + ...\right] \otimes S(\lambda)$$

$$= rA(\lambda) \otimes S(\lambda) + r(\alpha\sin k\lambda)[A'(\lambda) \otimes S(\lambda)] +$$

$$\frac{r}{2}(\alpha\sin k\lambda)^2[A''(\lambda) \otimes S(\lambda)] + ...$$

wherein A'(λ) and A"(λ) are the first-order and second-order derivatives of the transmittance spectrum A(λ) of the tunable optical filter 102, respectively.

For the lock-in detection by lock-in detector 114, D(t) is multiplied by cos (2ω₀t) and is integrated during time Δt. When the integration time is long enough compared with the oscillation period and A"(λ)⊗S (λ) varies little during integration time, the lock-in detector output 140 is approximately given by the following equation $$L(t) \approx \frac{r\alpha^2 \Delta t}{8}\{-A''(\lambda) \otimes S(\lambda)\}$$

wherein L(f) is the electrical output of lock-in detector 114 appearing on line 140.

Therefore, the lock-in detector output 140 is proportional to the convolution function of –A"(λ) and S(λ).

Generally, the transmittance spectrum of a tunable optical filter can be presented by one of three functions—namely, the gaussian, sinc, and airy functions. Among those three types of functions, only the second order derivative of the airy function has small side lobes. It is well known that a Fabry-Perot filter has a transmittance spectrum of the airy function.

Figure 8:
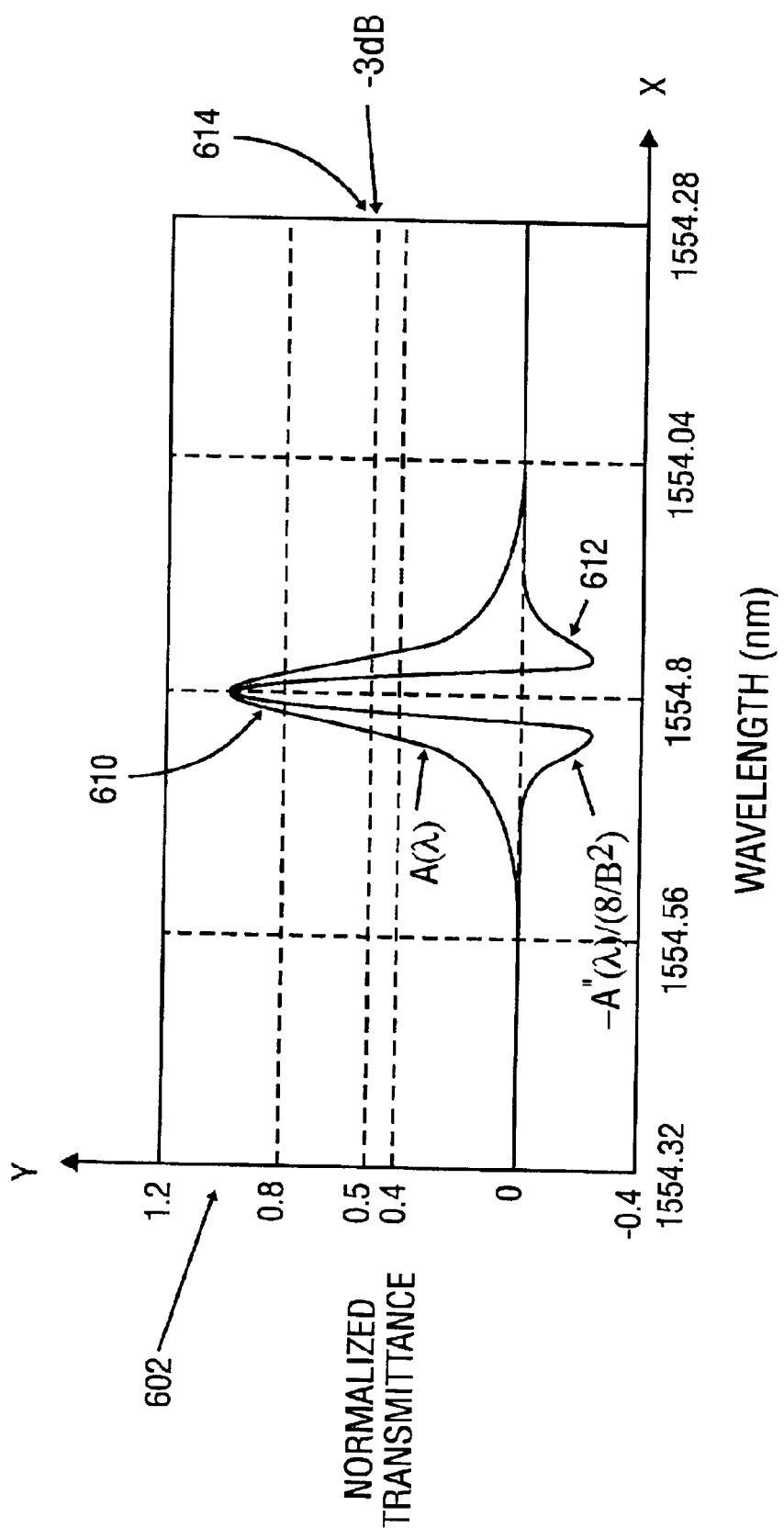
FIG. 8 shows the normalized transmittance spectra of an airy function.

FIG. 8 shows a graph 602 of transmittance versus wavelength in nm. Graph 602 shows a plot 610 of the transmittance spectrum A(λ) of a tunable Fabry-Perot optical filter. FIG. 8 also shows a plot 612 of –A"(λ) that is normalized to 8/B², which is the inverse of the second derivative of the transmittance spectrum A(λ) normalized to 8/B².

For the plots 610 and 612 shown in FIG. 8, the finesse F and 3-dB bandwidth of the tunable Fabry-Perot optical filter are 1676 and 0.06 nm, respectively.

FIG. 8 shows that the 3-dB bandwidth of spectrum 612 is approximately 0.33 times the 3-dB bandwidth of spectrum 610. In other words, the 3-dB bandwidth of the spectrum 612 representing –A"(λ)/(8/B²) is approximately ⅓ of the 3-dB bandwidth of the transmittance spectrum A(λ) 610 of the tunable optical filter. This can be seen in plot 602 given that the spectrum 612 is narrower at point 614 than spectrum 610.

Figure 9:
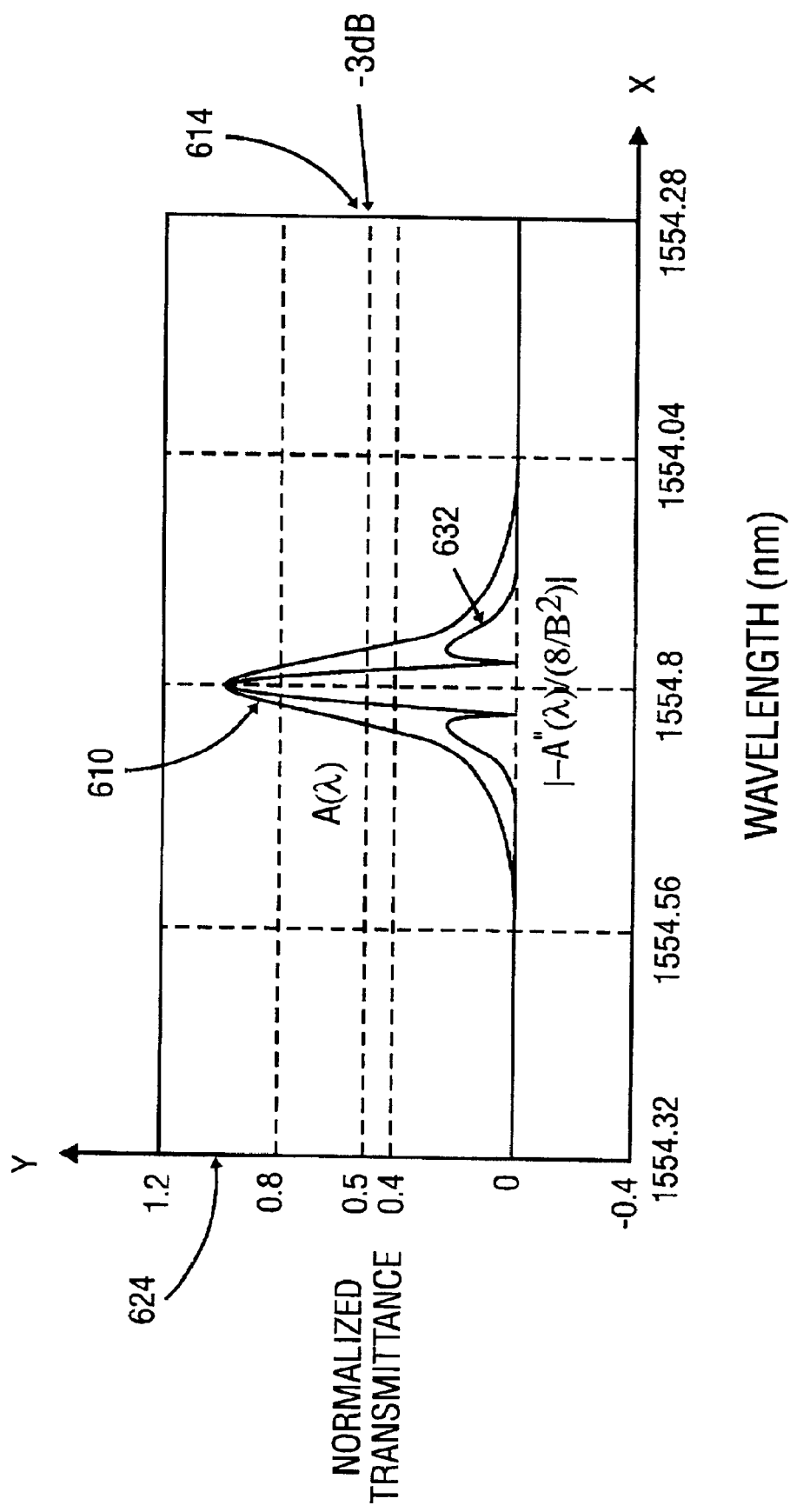
FIG. 9 shows the absolute values of the normalized transmittance spectra of the airy function.

As shown in FIG. 8, a portion of spectrum 612 resides in the negative region below zero on the Y-axis. FIG. 9 shows a plot 624 of spectrum 632, which is the absolute value of spectrum 612. In other words, spectrum 632 is the absolute value of –A"(λ)/(8/B²). As shown in FIG. 9, the absolute values of the negative portions of spectrum 612 are smaller than the amplitude of spectrum 610 at the same wavelengths. Although the negative parts of the spectrum 612 could cause errors in channel power measurement, the absolute value of the measure errors would be less than those caused by the wide skirt-like transmittance spectrum A(λ) of spectrum 610. This is shown by the fact that spectrum 632 resides inside spectrum 610 in FIG. 9.

Therefore, the method 200 of FIG. 4 and apparatuses 100 and 500 of FIG. 3 and FIG. 7 enhance the resolving power of the tunable Fabry-Perot optical filter 102 by about three times. By enhancing the resolving power of tunable Fabry-Perot optical filter 102, apparatuses 100 and 500 and method 200 allow more closely spaced channels to be resolved by filter 102. In other words, channels with more narrow spacings can be sent through tunable optical filter 102 without interference among them.

Figure 10:
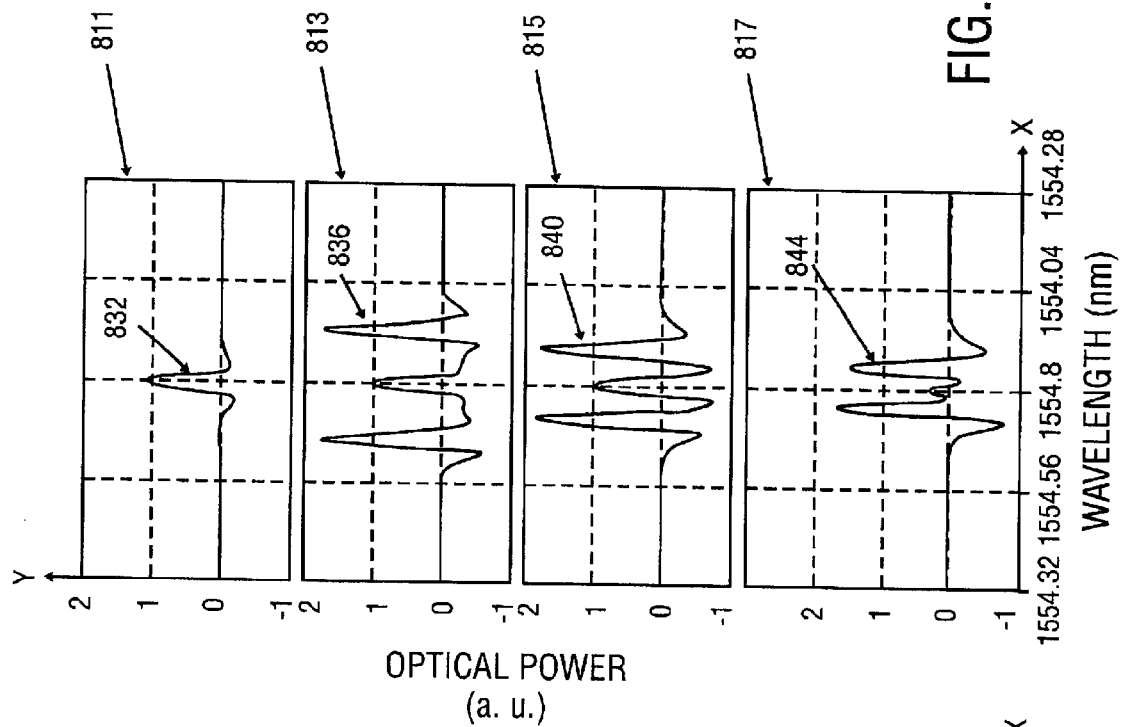
FIG. 10. shows measured optical power versus wavelength for optical inputs to the tunable Fabry-Perot optical filter comprising a single channel and three channels having respective channel spacings of 0.12 nm, 0.08 nm, and 0.04 nm.
Figure 10:
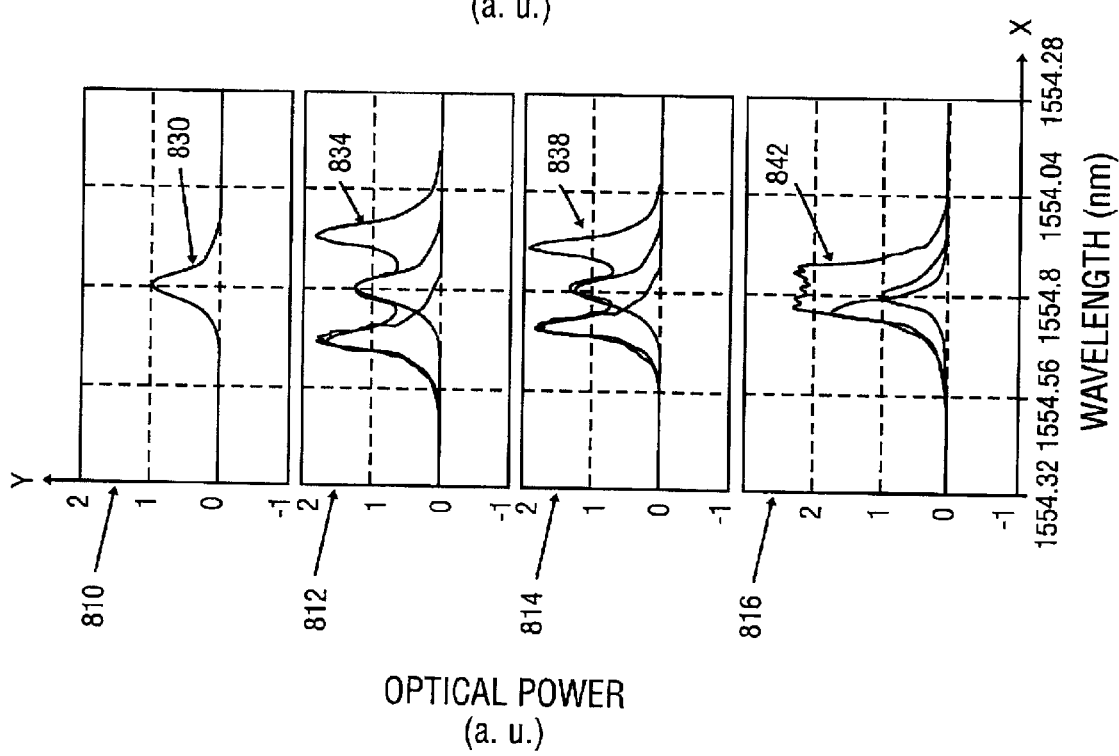

FIG. 10 illustrates experimental results using apparatus 500 of FIG. 7. Oscilloscope 520 is used to generate the graphs of FIG. 10. For FIG. 10, function generator 108 was used to generate the 10-kHz dithering signal 130. The 10-kHz signal 130 was also sent to frequency doubler 510 to generate the 20-kHz reference signal 132 applied to lock-in detector 114 via phase shifter 512. The tunable Fabry-Perot optical filter 102 used for the results for FIG. 10 has a finesse of 1676 and a 3-dB bandwidth of 0.06 nm.

For the graphs shown in FIG. 10, each of the X axes has been converted from a time axis of the outputs into a wavelength axis.

Graphs 810, 812, 814, and 816 display optical power versus wavelength measured at output 138 of photodetector 110 when switch 122 is open—i.e, when 10-kHz signal 130 is not applied to Fabry-Perot filter 102. For graphs 810, 812, 814, and 816, only the 1-Hz ramp signal 116 is applied to Fabry-Perot filter 102.

Graphs 811, 813, 815, and 817 represent the output 140 of lock-in detector 114 when switch 122 is closed, which means the 10-kHz signal 130 and the 1-Hz signal 116 are summed by circuitry 120 and applied to Fabry-Perot filter 102.

For graphs 810 and 811, only a single DFB LD is used. For example, only DFB LD 531 is energized. For graphs 810 and 811, DFB LD 531 has a very narrow linewidth. Thus, for graphs 810 and 811, an optical channel with a very narrow linewidth is applied as an input to tunable Fabry-Perot optical filter 102. It can be seen that the waveform 830 has the almost same shape as waveform 610 shown in FIGS. 8 and 9. It can also be seen that waveform 832 has the almost same shape as waveform 612 shown in FIG. 8.

To see the resolving power enhancement, three optical channels for three different channel spacings were inputted into Fabry-Perot filter 102. Graphs 812 through 817 represent all three DFB LDs 530 through 532 being energized. For graphs 812 and 813, the channel spacing between distributed feedback diodes 530–532 is 0.12 nm. For graphs 814 and 815, the channel spacing between the DFB LDs 530–532 is 0.08 nm. For graphs 816 and 817, the channel spacing between the DFB LDs 530–532 is 0.04 nm.

Spectra 834, 838, and 842 include two spectra that indicate outputs measured at photodetector 110 output 138 of the left and center channels respectively.

Three peaks are clearly recognizable in spectra 834 and 838 when the channel spacing is 0.12 nm for graph 812 and 0.08 nm for graph 814. That is because the Fabry-Perot filter 102 that is used has a 3-dB bandwidth of 0.06 nm.

However, when the channel spacing is 0.04 nm as shown by spectrum 842 in graph 816, it is difficult to recognize the three peaks of the channels in the output 138 of photodetector 110. For waveform 842, the optical channels overlap and look like a broadband light. In contrast, it is relatively easy to recognize the three peaks in waveform 844 of graph 817, which represents the output 140 of lock-in detector 114. With further signal processing, the three channel lights in waveform 844 could become even more distinct. Thus, apparatuses 500 and 100 and the method 200 allow the monitoring of DWMD signals with a relatively &wide bandwidth tunable Fabry-Perot optical filter.

Figure 11:
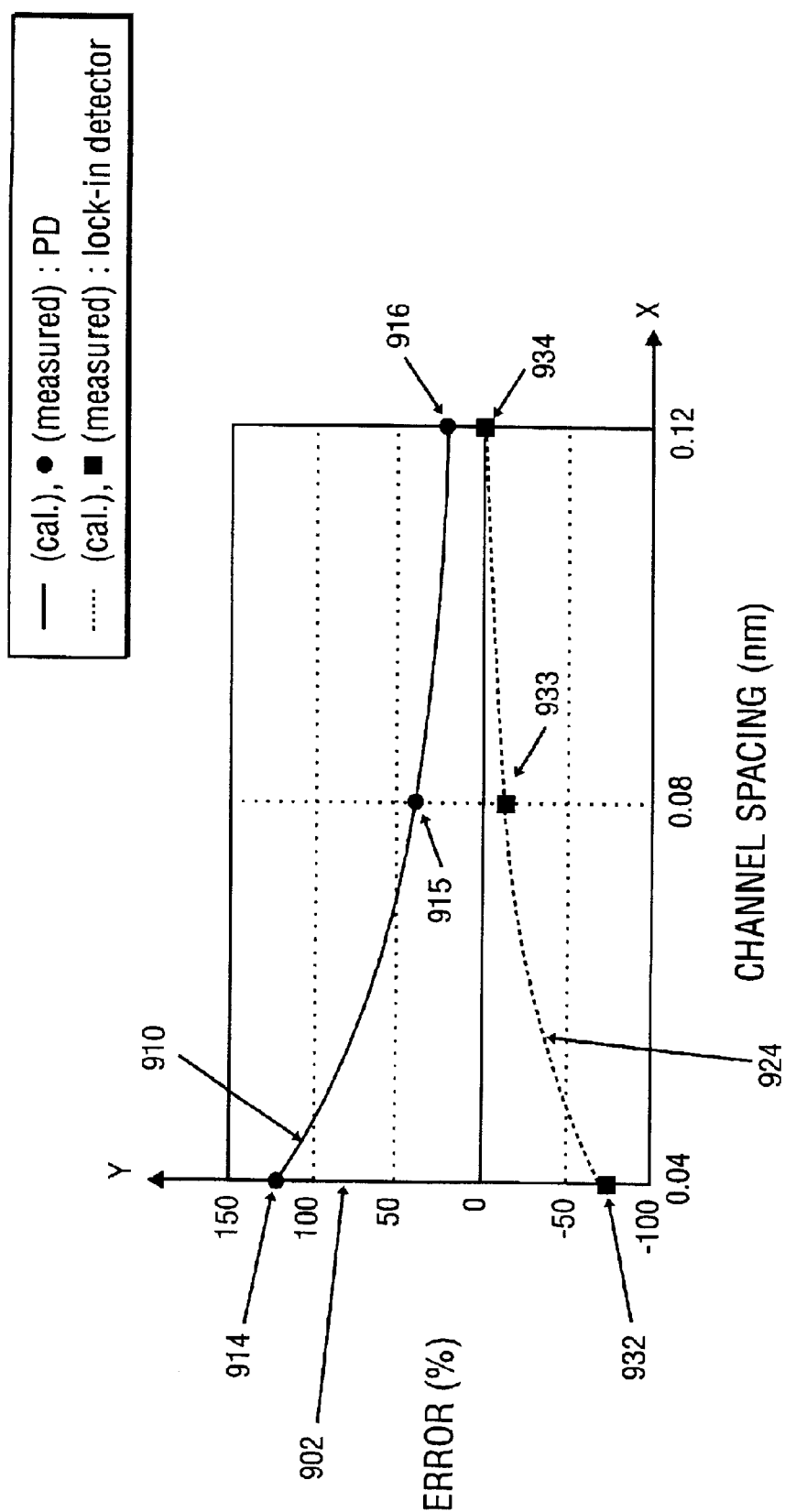
FIG. 11 shows calculated and measured errors of center channel power.

FIG. 11 is a graph 902 of percent error on the Y-axis and channel spacing in nm on the X-axis. Graph 902 is a graph of the calculated and measured errors of the center channel power—i.e., the power of DFB LD 531. Error is defined for FIG. 11 as the ratio of optical power affected by the side channels of DFB LDs 530 and 532 to the center channel power of DFB LD 531. Line 910 represents the calculated errors for the output 138 of photodetector 110. Line 924 represents the calculated errors for on the output 140 of lock-in detector 114. Points 914, 915, and 916 represent the measured errors at the output 138 of photodetector 110. Points 932, 933 and 934 represent the measured errors at the output 140 of lock-in detector 114. The calculated and measured errors shown in FIG. 11 are with respect to the experimental results shown in displays 812 through 817 of FIG. 10.

The output 138 of photodetector 110 always gives positive errors. In contrast, the output 140 of lock-in detector 114 gives negative errors because of the negative portions of waveform 612 of FIG. 8. Graph 902 shows that the absolute values of the errors from output 140 of lock-in detector 114 are always smaller than the errors 138 from photodetector 110.

Thus, as shown by both theory and experiments, measurement errors can be decreased by using apparatuses 500 and 100 and method 200 of the embodiments of the invention. Optical channels with a spacing of 0.04 nm are discernable with a Fabry-Perot tunable optical filter 102 having a 3-dB bandwidth of 0.06 nm. Channel power measurement errors decrease. Embodiments of the present invention allow the use of a cheaper and wider Fabry-Perot tunable optical filter for accurate channel power measurement in place of a more expensive Fabry-Perot tunable optical filter with a narrow bandwidth that may also have a reduced output intensity for optical signals.

Embodiments of the present invention can be used for optical signal quality monitoring. Embodiments of the invention can be used in an optical channel analyzer for a DWDM system.

In the foregoing specification, the Invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for enhancing a resolving power of a tunable optical filter comprising:
applying an optical input to the tunable optical filter;
applying to the tunable optical filter an electrical signal having a first component having a first frequency and a second component having a second frequency, wherein the second frequency is higher than the first frequency;
detecting an optical output of the tunable optical filter.

2. The method of claim 1, wherein the tunable optical filter has a transmittance spectrum that can be represented by an airy function.

3. The method of claim 1, wherein the tunable optical filter is a tunable Fabry-Perot optical filter.

4. The method of claim 1, wherein the optical input comprises a plurality of optical channels.

5. The method of claim 1, wherein the first component is a ramp signal and the second component is a sinusoidal signal.

6. The method of claim 1, wherein detecting an optical output of the tunable optical filter comprises:
applying the optical output of the tunable optical filter to a photodetector,
applying an electrical output from the photodetector to a lock-in detector;
generating an electrical signal having a third frequency, wherein the third frequency is a multiple of the second frequency;
generating a phase-shifted electrical signal by phase-shifting the electrical signal having the third frequency;
applying an electrical signal having a third frequency to the lock-in detector, monitoring an output of the lock-in detector.

7. The method of claim 6, wherein the third frequency is twice the second frequency.

8. An apparatus comprising:
circuitry that generates a first component having a first frequency;
circuitry that generates a second component having a second frequency, wherein the second frequency is higher than the first frequency;
circuitry that combines the first component and the second component to generate an electrical signal;
circuitry that applies the electrical signal as an electrical tuning input to a tunable optical filter.

9. The apparatus of claim 8, wherein the tunable optical filter is a tunable Fabry-Perot optical filter.

10. The apparatus of claim 8, wherein the first component is a ramp signal and the second component is a sinusoidal signal.

11. The apparatus of claim 8, further comprising:
a photodetector that detects an optical output of the tunable optical filter;
a lock-in detector coupled to an electrical output of the photodetector;
frequency doubling circuitry that is coupled to the lock-in detector and that doubles the second frequency;
a phase shifter coupled between the frequency doubling circuitry and the lock-in detector.

12. An apparatus comprising:
means for generating a first electrical signal having a first frequency;
means for generating a second electrical signal having a second frequency that is higher than the first frequency;
means for applying a combination of the first and second electrical signals to tunable optical filtering means.

13. The apparatus of claim 12, wherein the tunable optical filtering means comprises a tunable Fabry-Perot optical filter.

14. A method comprising:

generating a first electrical signal having a first frequency;

generating a second electrical signal having a second frequency that is higher than the first frequency;

coupling a combination of the first and second electrical signals to a tunable optical filter;

applying an optical input to the tunable optical filter while the combination of the first and second electrical signals is being applied to the tunable optical filter;

applying an optical output of the tunable optical filter to a photodetector;

coupling an electrical output from the photodetector to a lock-in detector;

generating a third electrical signal having a frequency that is double the second frequency;

phase shifting the third electrical signal;

coupling the phase shifted third electrical signal to the lock-in detector;

monitoring an output of the lock-in detector.

15. The method of claim 14, wherein the tunable optical filter comprises a tunable Fabry-Perot optical filter.

16. The method of claim 14, wherein the optical input comprises a dense wavelength division multiplexing optical input.

\* \* \* \* \*